March 10, 1953   W. B. RETZ   2,630,621
RECESSING MEANS
Filed Jan. 24, 1949   5 Sheets-Sheet 1

INVENTOR
WILLIAM B. RETZ
BY
Mitchell Bechert
ATTORNEYS

March 10, 1953 W. B. RETZ 2,630,621
RECESSING MEANS
Filed Jan. 24, 1949 5 Sheets-Sheet 2

INVENTOR
WILLIAM B. RETZ
BY
Mitchell Bechert
ATTORNEYS

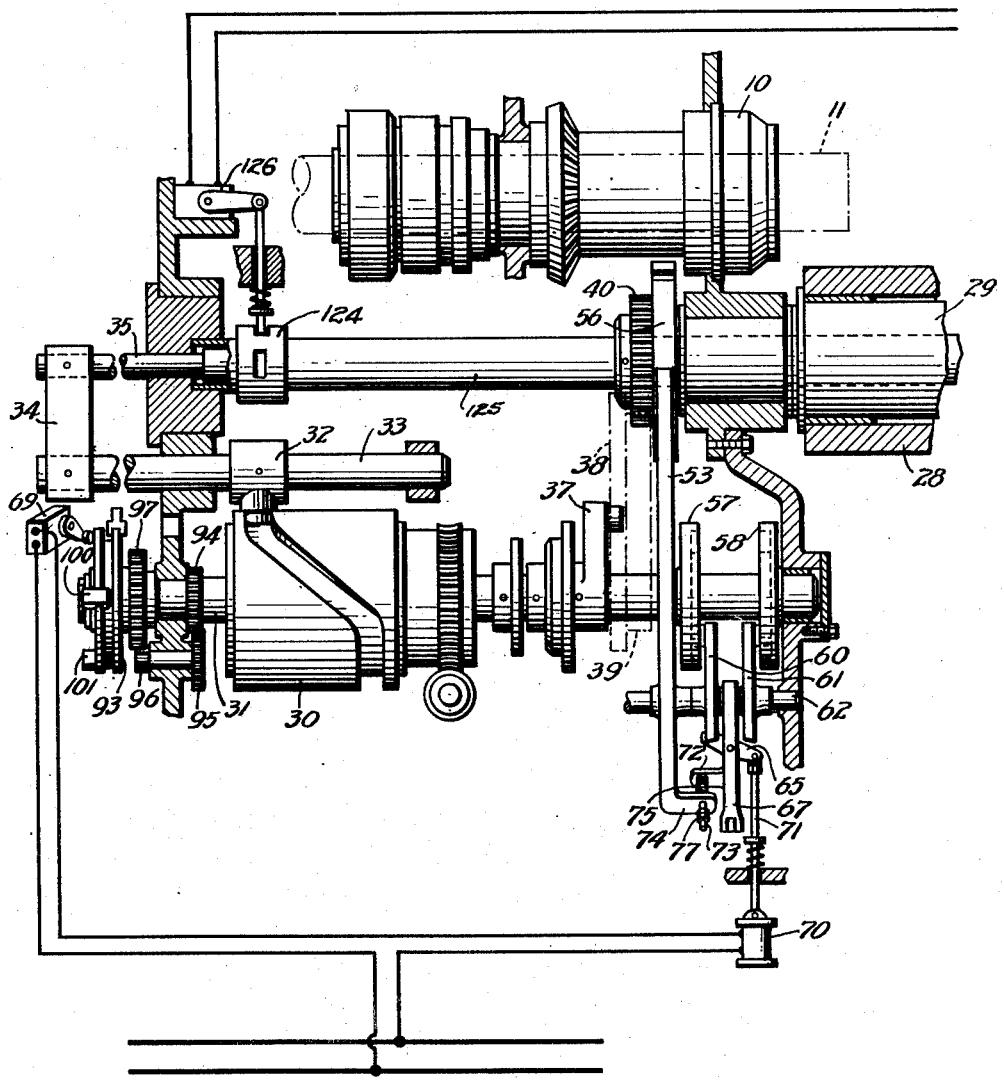

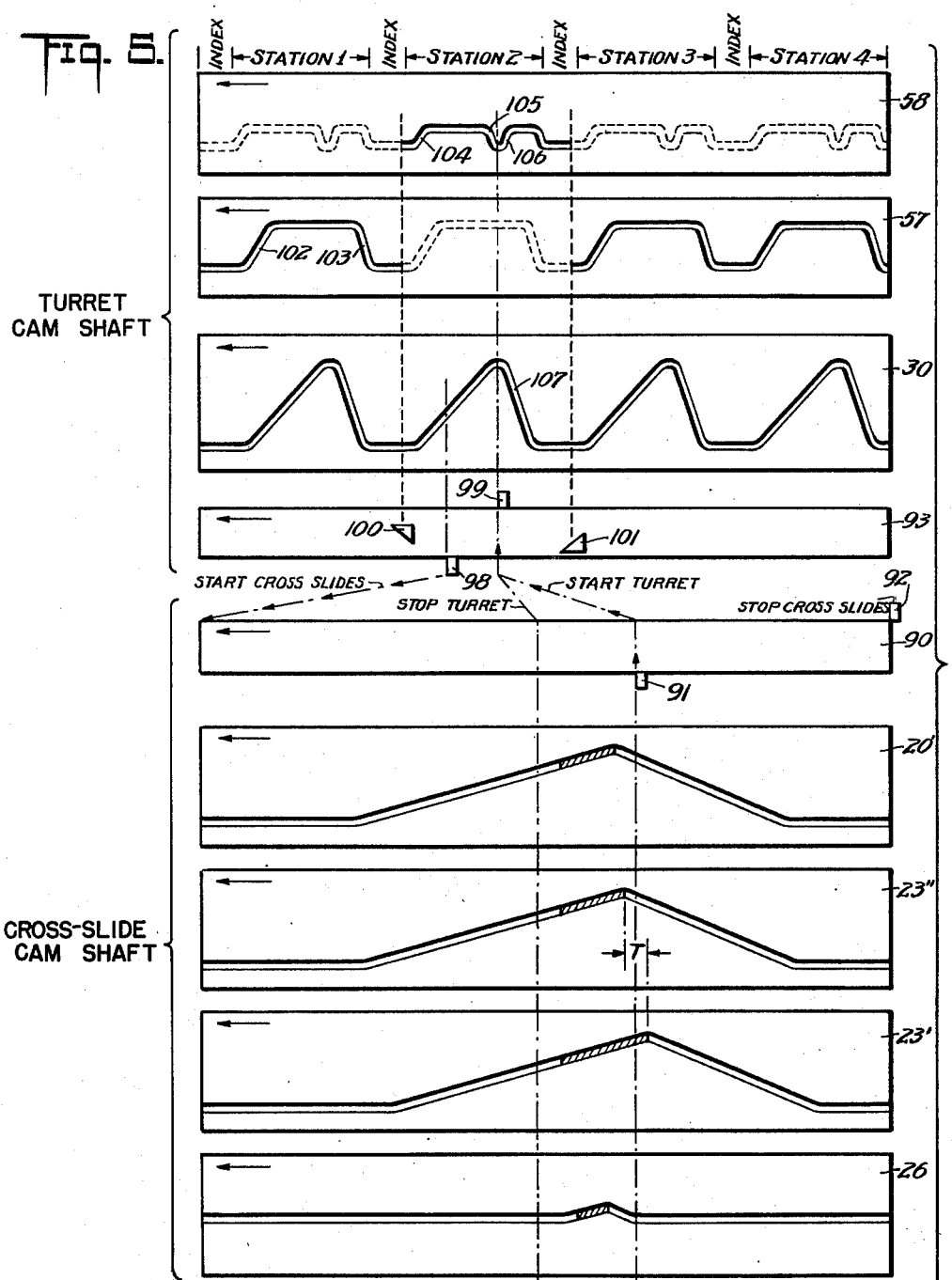
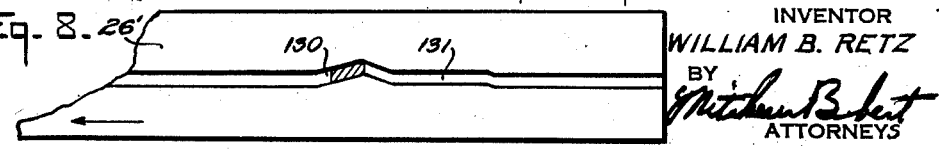

March 10, 1953　　　W. B. RETZ　　　2,630,621
RECESSING MEANS

Filed Jan. 24, 1949　　　　　　　　　5 Sheets-Sheet 5

INVENTOR
WILLIAM B. RETZ
BY
ATTORNEYS

Patented Mar. 10, 1953

2,630,621

UNITED STATES PATENT OFFICE 2,630,621

RECESSING MEANS

William B. Retz, Plainville, Conn., assignor to The New Britain Machine Company, New Britain, Conn., a corporation of Connecticut Application January 24, 1949, Serial No. 72,418

16 Claims. (Cl. 29—39)

My invention relates to a machine tool, and in particular to means for producing a novel movement having utility in the generation of a recess in a machine operation.

It is an object of the invention to provide an improved device of the character indicated.

It is another object to provide improved recessing means for a turret-type lathe.

Another object is to provide means for incrementally indexing a turret in order to perform a cutting operation.

It is also an object to provide recessing means for an indexible lathe-type machine, the said recessing means being effective at one of a plurality of indexible working stations.

It is still another object to provide improved locking means for the indexible means of a machine of the character indicated, the locking means being effective in accordance with different selected locking programs for different indexed positions of said indexible means.

It is a more specific object to provide a machine of the character indicated in which recessing and forming operations may be simultaneously carried out on the same piece of work.

It is still another specific object to provide an improved means of the character indicated, wherein recessing and cut-off operations may be performed concurrently.

Other objects and various further features of the invention will be pointed out or will occur to those skilled in the art from a reading of the following specification in conjunction with the accompanying drawings. In said drawings, which show, for illustrative purposes only, a preferred form of the invention:

Fig. 3 is an enlarged perspective view of certain parts of the mechanism of Fig. 1;

Fig. 4 is a simplified schematic representation of parts of the machine of Fig. 1;

Fig. 5 is a layout of program means for the machine of Fig. 1;

Fig. 8 represents a modified cam for substituted use with the program means of Fig. 5.

Figure 1:
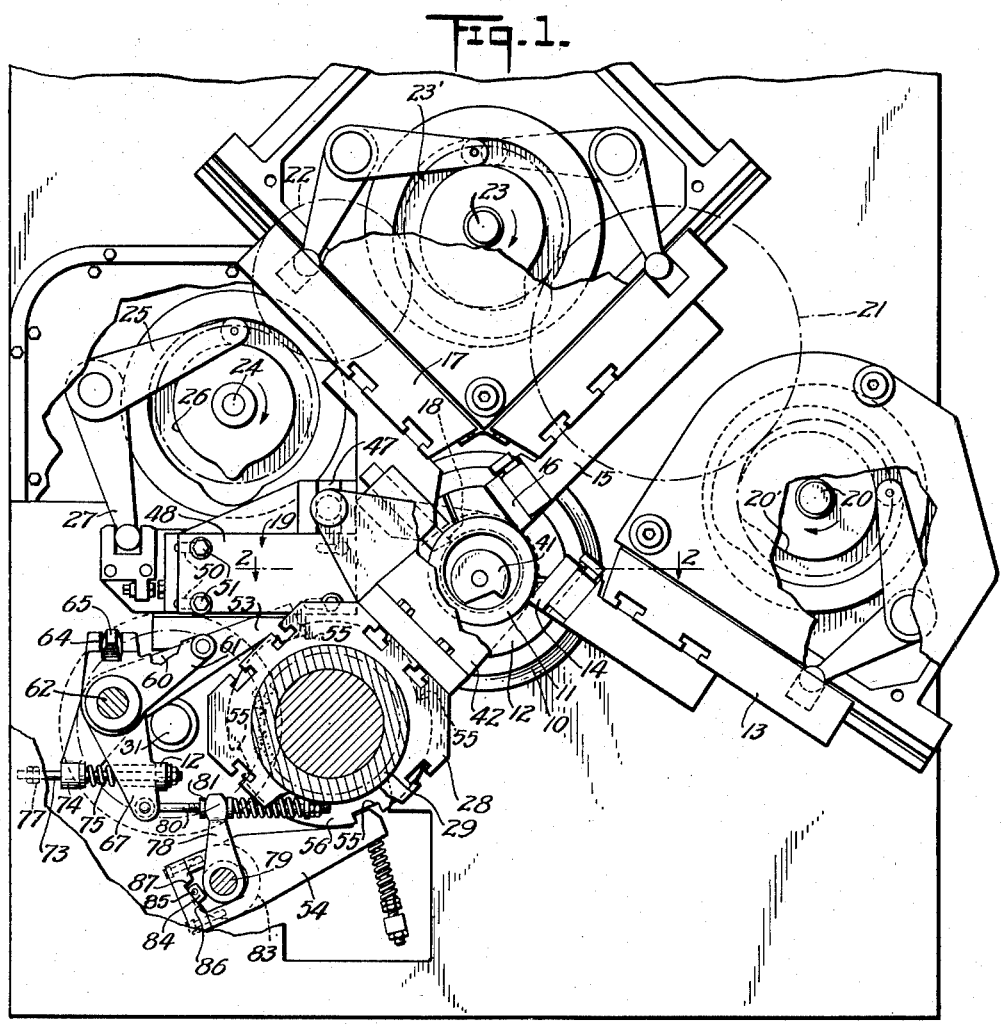
Fig. 1 is a partly sectionalized and partly broken-away front elevation of a machine incorporating features of the invention.

Although my invention is described in application to a novel recessing means, the invention broadly contemplates the introduction of a novel relative movement in a machine having a work holder, a tool holder, and indexible means for one of said holders. The novel movement consists of the application of an incremental indexing motion to the indexible means when the indexible means is at the indexed position in which said holders are to cooperate. In the form to be described, the machine is a turret lathe including cross- or forming-slide means and an indexible turret. The forming-slide means and the turret may effectively engage one another off the turret-index axis for one indexed position of the turret; and, when so engaged, a feed of the cross-slide means may impart an angular feeding movement to the turret. If a recessing operation is to be performed at the station in which the incremental indexing takes place, then the normal feed of the turret may bring the recessing tool into a position within the work, and the cross-slide means may advance the tool to cut a recess; the cross-slide may thereafter withdraw the tool from the recess, before the turret-feed means is effective longitudinally to withdraw the tool from within the work. Also in the form to be described, novel locking means may be employed for the turret, in order to assure proper engagement of the turret or turret-borne tool holder with the cross-slide means during a feeding movement of the turret at the recessing station; the locking means may then effectively release the turret for angular or indexing freedom during the feed cycle of the cross-slide means. If desired, the locking means may again take over to locate the turret after completion of the feed cycle of the cross-slide means and during longitudinal withdrawal of the turret and, hence, of the recessing tool from the work.

Referring to Figs. 1 to 5 of the drawings, my invention is shown in application to a lathe-type machine having a single spindle 10 for continuous rotation of a piece of work 11. Collet means 12 may support the work 11, and, in the form shown, the collet 12 is hollow in order to accommodate the internal feeding of tubular stock 11. The machine may include a plurality of forming or cross slides, such as the slide 13 for a forming tool 14, the slide 15 for another forming tool or for an end-facing tool 16, the slide 17 (cut-off tool slide) for a cut-off tool 18, and the slide 19 (recess cross slide) for a purpose which will later be clear. All slides constituting the forming-slide means may have a common drive, which will be termed the forming-slide camshaft 20, and a plurality of idler gears 21—22 may serve to couple the drive pinions of the program shafts 20—23—24 for the various forming slides. In the form shown, each cross slide is driven through bellcrank cam-follower means cooperating with cam means on one of the shafts 20—23—24, and, in the case of the forming slide 19, the cam-follower arm 25 rides a cam 26 on the shaft 24. The cam follower 25 may include an arm 27 for feeding engagement with the cross slide 19, as will be clear.

The machine may further include a longitudinally displaceable turret 28 supported for longitudinal sliding motion on an arbor or stem 29. The longitudinal sliding motion for the turret 28 may be derived from a main feed cam 30 that is mounted on a shaft 31, which will be termed the turret camshaft 31. Cam-follower means 32 may ride the cam 30 and thus displace a slide rod 33 clamped rearwardly of the machine, as by a bar 34, to a feed rod 35 in feeding relation with the turret 28. The turret camshaft may rotate once for each indexed position of the turret 28 and, since the turret 28 is shown to have four stations, four revolutions of the turret camshaft 31 may take place for each complete cycle of turret operation.

Indexing means for the turret 28 may be driven directly from the turret camshaft 31, and in the form shown I employ a Geneva arm 37 to engage a Geneva wheel 38 coupled by suitable gearing 39—40 in index-driving relation with the turret 28. The mechanism which has thus far been described is generally in accordance with that more fully treated in the copending patent application of Donald H. Montgomery, Serial No. 2,363, filed January 15, 1948.

In accordance with a feature of the invention, I employ means for introducing a novel motion in the turret 28 for one selected indexed position of the turret 28, and this new movement may be particularly useful in performing a recessing operation within the work 11. I have, therefore, shown a recessing tool 41 held by a suitable tool holder 42 at one index station of the turret 28, and the placement of the recessing tool 41 is preferably such that it will be properly axially placed within the work 11 for one feed position of the turret 28; for a retracted or withdrawn position of the turret 28 the tool 41 may completely axially clear the outwardly projecting end of the work 11, thus permitting free indexing of the turret 28. The tool 41 is shown to be generally circular and to have dual beads 41', as for the cutting of double ball recesses in the outer bearing ring of a double-row ball bearing.

In order that the recessing operation may proceed for but one indexed position of the turret 28, I provide means effectively engaging the turret 28 to the cross-slide means 19 only for the desired recessing position or station of the turret 28. In the form shown, this engagement is effected by mutually cooperating abutting surfaces on the tool holder 42 and on the cross slide 19. For this purpose, the tool holder may be formed with a laterally projecting arm 45 supporting a roll 46 to engage a slot or way 47 extending generally radially of the turret axis; the slot or way 47 may be on a part carried by the cross slide 19 or it may be formed integrally therewith. In the form shown, the slot or way 47 is mounted upon an adjustable member 48 which by means of a slotted engagement, as at 50 with the cross slide 19, may be adjusted for a perfect engagement with the roll 46 of the recessing-tool holder, upon a longitudinal feed of the turret, as will be clear. Bolts 51 may secure the adjusted placement of the member 48 on the cross-slide 19.

With the mechanism thus far described, it will be appreciated that for the index station at which recessing is to take place, the roll 46 may engage the slot 47 of the cross-slide means 19 as the turret 28 approaches the end of its feed stroke. Upon completion of such feed, the cross-slide feed means may become effective to urge the tool-holder roll 46 clockwise (in the sense of Fig. 1) about the turret axis. Such motion will be understood to impart a generally radial cutting feed to the recessing tool 41 within the work 11. Upon completion of the recessing cut, the cam 26 may immediately withdraw the recessing tool 41 into longitudinal end-clearing relation with the inner surface of the work 11, and the turret-feed cam 30 may then longitudinally withdraw the turret 28 and hence the recessing tool 41 from within the work 11. If desired, the described recessing operation may take place during a dwell on the main feed cam 30 between the feed rise and the withdrawal slope of the said cam 30; however, in the arrangement shown, I employ means for stopping the turret camshaft 31 when in the forwardly fed position, such stopping means being effective only for the index station at which recessing takes place, as will be more fully described later.

In accordance with a further feature of the invention, I make novel use of turret-locking means in order positively to assure perfect engagement of the recess-tool follower roll 46 with the cross-slide slot 47 and to assure continuous control of the angular positioning of the turret at all times. The locking means for the turret 28 may be generally similar to that described in complete detail in my copending patent application, Serial No. 37,490, filed July 7, 1948. Such mechanism may employ a locating arm 53 and a locking arm 54 to engage generally diametrically opposite slots 55 in a locking plate or flange 56 carried with indexing movement of the turret 28. Controlling movements for the locating and locking levers 53—54 may be determined by cam means on the turret camshaft 31, and, in the form shown, I employ two face cams 57—58 and a shiftable mechanism for selectably employing the program of one or the other of cams 57—58 to operate the locating and locking means 53—54. Cam followers 60—61 may continuously ride the cams 57—58, respectively, and each of the followers 60—61 may be mounted to rock on a common shaft 62. Each of the followers 60—61 may include means, such as abutments or slots 63—64, respectively, to be engaged by an adjustably positionable rocker element 65. The rocker element 65 may in turn be supported on a transverse pin 66 carried by a rocker member 67 that is also pivotally supported on the shaft 62.

It will be appreciated that, when the shiftable member 65 is in the position shown in Fig. 3 so as to engage itself in the slot 64 of the cam follower 61, the resultant motion of the rocker or crank 67 will be in accordance with the program of the cam 58. If, on the other hand, the shiftable member 65 is displaced into engagement with the slot 63 of the cam follower 60, the rocker or crank 67 may follow the program of the cam 57. In the form shown, the shiftable member 65 is solenoid actuated, as when a switch 69 closes its contacts to energize a solenoid 70 that may be linked by a rod 71 to the shiftable member 65.

The rocker or crank 67 may carry means to actuate both the locating and locking means 53—54. In the form shown, a lug or bracket 72 integrally formed with the crank 67 may directly actuate the locating arm through a resiliently opposed lost-motion connection. Thus, a connecting rod 73 between the lug 72 of crank 67 and a part 74 of the locating arm 53 may normally be urged by a compression spring 75 for clockwise rotation (in the sense of Figs. 1 and 3) about the pivot shaft 62 upon which the locating arm 53 may also be mounted. For the relationship of parts shown, the cam 58 thus forcibly rotates the crank or arm 67 clockwise so as to force resilient placement of the locating arm 53 in the slot 55 of the locking plate 56. When the cam follower 61 strikes a rise in the cam 58, counterclockwise motion will be permitted the cam follower 61 (and hence the crank 67 that is connected to and effectively a part of the cam follower 61); when this movement has been sufficient to compel abutment of stop nuts 77 with the lower part of the locating arm 53, there may be a forcible ejection or retraction of the locating arm 53 from possible engagement with the locating plate 56.

Concurrently with the above-described operation of the locating arm 53, the crank 67 may also control operation of the locking arm 54. As in the case of my above-mentioned copending application, this operation of the locking arm 54 may be accomplished through a resiliently opposed lost-motion connection to a crank 78 on a rocker shaft 79. For this purpose, a connecting rod 80 may link the crank 67 effectively to the arm 78. In the form shown, a fixed or an adjustably fixed abutment 81 on the connecting rod 80 serves to engage one side of the arm 78, and an adjustably compressible spring 82 may engage the other side of the arm 78. The rocker shaft 79 may carry suitable means, such as a disc 83, in order to apply a cranked displacement to a cam or wedge block 84 supported by crank-pin means 85 on the disc 83. The wedge block 84 may ride an inclined surface 86 at the lower end of the locking lever 54. As described more fully in my said copending application, the function of the slidable wedge block 84 is to induce a final jamming force directed generally tangentially of the locking plate 56 after both the locking and locating levers 53 have been allowed resiliently to engage their diametrically opposite slots 55 in the locking plate 56. When the cam follower 60 or 61 (depending upon which follower has been dogged to crank 67) strikes the unlocking rise of the cam (57 or 58), the fixed abutment means 81 may so crank the arm 78 as not only to relieve the binding forces applied by the wedge block 84 but also positively to drive the wedge block 84 against the abutment 87 at the end of the wedging surface 86, thus applying a clockwise turning moment to the locking lever 54 for positive removal of the same from the slot 55 in which it had previously been locked.

An improved understanding of the operation of the above-described machine may be had by reference to Fig. 5, wherein a number of cams or other programming means are laid out in exaggerated proportions in order to demonstrate a timing of events. In the particular machine described in the above mentioned Montgomery patent application, some of the events may be timed by the turret camshaft 31 and others may be timed by the forming-slide camshaft 20. Provision may be made on one of these camshafts for clutching in the other camshaft, and for then shutting off the drive to the said one camshaft; likewise, provision may be made for clutching in the said one camshaft in accordance with an event determined by the said other camshaft, and for then shutting off the drive to said other camshaft. None of the drives for these camshafts are shown in the present application, and it has been considered sufficient for present purposes merely to show cam or timing lugs on the various camshafts for performing the clutching and throw-out functions indicated.

In the case of the forming-slide camshaft 20, there may be mounted thereon (or driven in 1:1 relation therewith) a program drum or other means 90 having an adjustably placeable lug or other clutch-control means 91 for engaging the drive to the turret camshaft 31. The timing means on the forming-slide program drum 90 may further include a lug 92 to declutch or shut down the drive to the forming-slide camshaft 20.

On the turret-camshaft side of the machine, there may be included similar program means for engaging the drive to the forming-slide camshaft 20 and for shutting down the drive to the turret camshaft 31. Since the turret camshaft rotates once for every turret station, and since there are (in the form shown) four turret stations, I prefer that this turret-camshaft program means shall rotate only once for every four rotations of the camshaft 31. The turret-program means 93 may thus be driven through reduction-gear means 94—95—96—97 (see Fig. 4) in order to effect the desired speed reduction. The turret-program means 93 may carry with it an adjustable lug or other timing means 98 to engage the clutch for the drive to the forming-slide camshaft 20, and a further lug 99 may serve to shut off the drive to the turret camshaft 31. The turret-program means 93 may further include means, such as a cam 100, to engage the follower of the switch 69, in order to energize the circuit of switch 69 and of solenoid 70 and thus to permit the locking and unlocking functions to be governed by the cam 58. A second cam 101 on the program means 93 may further engage the follower of switch 69 to return the same to its closed condition, wherein the solenoid 70 is energized so that locating and locking functions may be governed by the cam 57.

Let it be assumed that, for the piece of work to be produced from the stock 11 by the above-described machine, two forming operations, a cut-off operation, and a recessing operation are required of the forming-slide means. Cross slides 13—15 governed by cams 20'—23'' may produce the two forming operations, while the cross slide 17 and the cross slide 19 may produce the cut-off and recessing functions in accordance with their programs 23' and 26, respectively. Let it also be assumed that on the turret there are end-working functions to be performed for the first station of the turret, while recessing is to be performed at the second station.

Upon commencement of a cycle of operations, a new length of stock 11 will have been fed out (by means not shown) and positioned for work at the first turret station; in Fig. 5, this first turret station is represented by the first of four serially developed cycles of rotation of the turret camshaft 31. In this first turret station, the switch 69 will still have been positioned with its contacts closed, so that the solenoid 70 is energized to cause turret locating and locking functions to be governed by the cam 57. Therefore, immediately after indexing into the said first station and upon commencement of the feed rise of the turret feed cam 30, the rise 102 of the locking and locating cam 57 will be effective completely to secure the locking plate 56 before the turret-fed tool or tools enter the work. These tools may perform their work while the turret is held locked; and, after completion of the work and preferably during retraction of the turret and of said tool at the first station, the drawback part 103 of cam 57 may be effective to free the locating and locking levers 53—54 from the locking plate 56, and thus to make possible unimpeded indexing of the turret into the second turret working station. For clarity of presentation, the program of cam 57 has been shown in solid lines at the first turret station in Fig. 5, while the program of cam 58 is in dotted lines; this will be understood to indicate that cam 57 is effective and that cam 58 is ineffective while the turret is in the first station.

Figure 2:
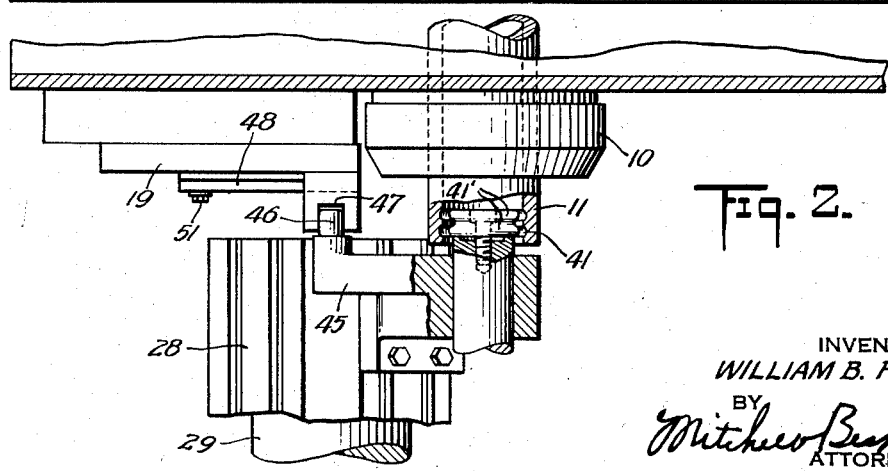
Fig. 2 is a fragmentary sectional view of parts of the machine of Fig. 1, taken more or less in the plane 2—2 of Fig. 1.
Figure 2:
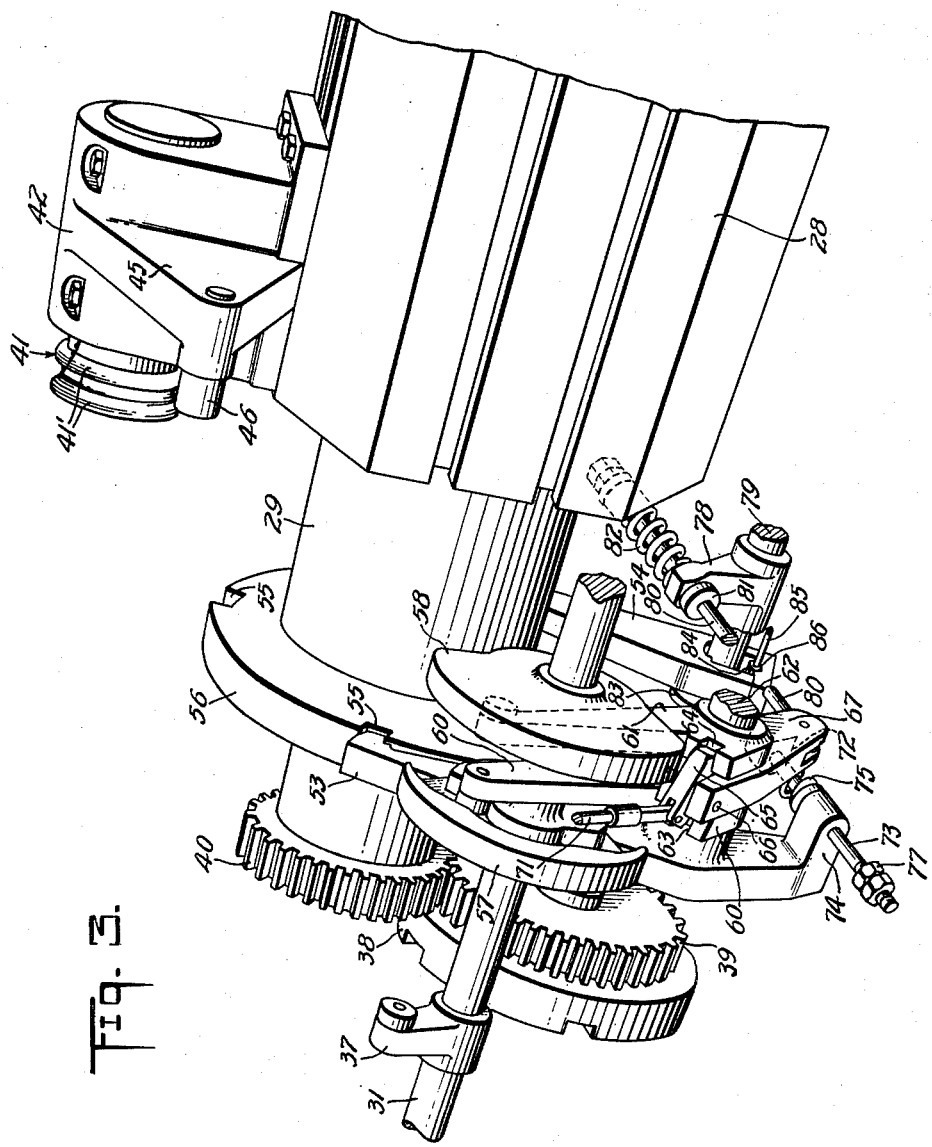

During the indexing interval between the first and second stations of the turret, or at least prior to commencement of the turret feed at the second station, cam 100 may be effective to open the contacts of switch 69 and thus to allow solenoid 70 to set up the locating and locking mechanism for operation in accordance with the program of cam 58 (shown in solid outlines in the second turret station in Fig. 2). Cam 58, it will be recalled, is specially contoured to permit the recessing operation, and, since no rigid locking is required for recessing, I prefer that the total rise for any part of the cam 58 be substantially less than the rise in cam 57 and that this rise be only for an amount sufficient to locate the locking plate 56, and not necessarily bindingly to secure the same. This mere locating function may be performed by the rise 104 of cam 58; and the rise 104 may be effective during the main feeding advance of the turret and until the recess-toolholder follower roll 46 has had a chance cleanly to engage the slot 47 in the cross slide 19. Sometime during this interval of turret feed, the lug 98 may have been effective to engage the clutch for the forming slides and thus to have started the forming-slide program means 90 as well as all the forming-slide means. Since the follower roll 46 has adequately engaged the cross-slide slot 47, the need for the turret-locating function has ceased, and the drawback surface 105 of cam 58 may be effective completely to disengage the locating and locking levers 53—54 from the locking plate 56. When so disengaged, and when the turret feed cam has advanced the turret to the full-feed position, the cam lug 99 on the turret program means 93 may be effective to shut down the drive to the turret camshaft 31 and to allow all forming operations including recessing to proceed.

In the form shown, the two forming tools 14—16 and the cut-off tool 18 may be so positioned and timed as to commence their cut at the same time. The cutting periods of the cams for these tool slides are shown shaded in Fig. 5, and it will be noted that the first forming tool 14, as governed by the cam 20', may be the first tool to complete its working stroke. Immediately behind the first forming tool, the second or finish-forming tool 16, as governed by the cam 23'', may be next to finish its next cutting stroke. Lastly, the cut-off tool 18, as governed by the cam 23', may drop the finished piece a period of time T after the second forming tool 16 has completed its stroke.

During the above-described cutting cycle of the tools 14—16—18, the recessing tool 41 will have been advanced into cutting engagement with the work and may have completed the recess while the forming tools are still cutting; also, while the forming tools are still cutting, the recess tool 41 may have been drawn back out of the recess and into axial clearance relation with the inner surface of the work 11. As soon as the recessing tool 41 is in such clearance relation, it is safe to permit the turret 28 to withdraw the recess tool 41; and, in the form shown, I have set the timing lug 91 to reengage the drive to the turret camshaft 31 immediately upon safe withdrawal of the recessing tool 41 from the recess it has just cut. Once the turret camshaft 31 has been thus restarted, a second rise 106 on the cam 58 may be effective again to locate the turret so that, while the drawback part 107 of the turret-feed cam 30 draws the turret away from the work and, hence, the follower roll 46 out of the slot 47, there may be continued control of the location of the turret. This control is preferably not released until after complete withdrawal of the turret and just as the Geneva arm 37 is about to engage the Geneva wheel 38 for the production of an index into the third turret station.

During this indexing from the second to the third turret stations or at least before the turret is brought around to the next working station of the turret, the cam lug 101 on the turret-program means 93 may be effective to operate the switch 69 for a return of the locking and locating mechanism to normal control by the cam 57. Since in the form shown all cutting operations have been performed on but two of the four stations of the turret 28, the third and fourth stations are not needed, and the turret camshaft may be driven at high speed (by means not shown) through the two unused stations. After passing through the two unused stations, the above-described cycle of operation may be repeated upon a newly fed-out piece of stock 11.

Figure 7:
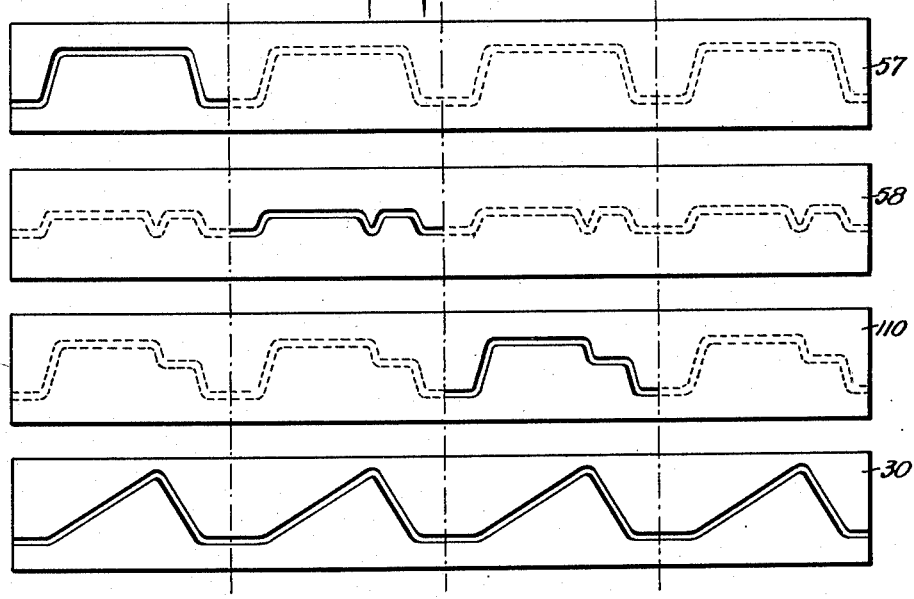
Fig. 7 is a layout of program means for the arrangement of Fig. 6.
Figure 6:
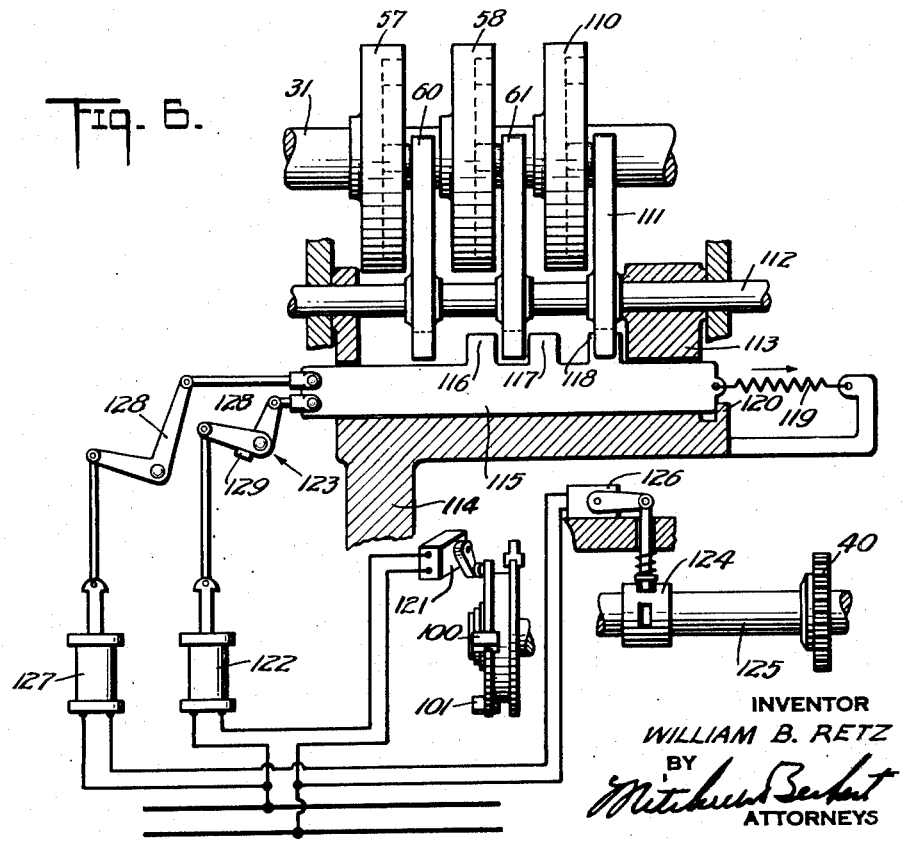
Fig. 6 is a simplified schematic showing of a modified construction according to the invention.

Referring now to Figs. 6 and 7, I show how the principles of my invention may be applied in a modification of the above-described single-spindle indexing-turret machine. In this modification, I illustrate that the turret 28 may not only be employed for normal end-working operations and for recessing in accordance with the above-described methods, but that the turret may also be operated in accordance with my above-mentioned copending patent application in order to prevent the generation of drawback marks upon the work 11, as during a turning operation by a turret-mounted tool.

To perform the indicated additional function, I provide a cluster of three cams for variously operating the locking and locating mechanism. The first two of these cams may be the same cams 57 and 58 which have already been described, and the cams 57—58 may again be driven by the turret camshaft 31. The third cam 110 may also be driven by the turret cam shaft 31 in order to provide the feature of preventing drawback marks at a given drawback station. All cams 57—58—110 may be continuously followed by longitudinally spaced cam followers 60—61—111 mounted upon a pivot shaft 112. Also mounted on the pivot shaft 112 may be a rocking member 113 having an actuating end or crank 114 similar to the crank 67 of the previously described locking and locating mechanism. In order that the crank 114 may operate locating and locking levers 53—54 in accordance with any one of the programs of cams 57—58—110, I have shown a shiftable bar 115 having lugs 116—117—118 for selective engagement with the various cam followers 60—61—111.

In the position of the bar 115 shown, the lug 118 dogs the rocking member 113 and, hence, the locating and locking mechanism for operation in accordance with the program of the cam 110; the machine is, therefore, set up to produce a turning operation upon the work 11 and to slightly incrementally index the turret 28 just before drawback, in order that the turning tool may not produce a drag-off mark on a turned surface which has just been cut on the work 11. In a second position of the shiftable bar 115, that is, when the lug 117 dogs the working member 113 to the cam follower 61, the locating and locking mechanism will be governed by the cam 58; in this position, the locating and locking mechanism will have been set up for performance of the recessing operation, as described above. In the third position of the bar 115, the lug 116 will have dogged the locating and locking mechanism for control by the normal cam 57, and there will be no freeing or partial freeing of the turret during any part of a period in which a tool is in or adjacent the work 11.

Relatively simple means may be provided for actuation of the selector bar 115 in accordance with the work to be performed at a particular indexed position of the turret. In the form shown, a tension spring 119 normally urges the selector bar 115 against an abutment or stop 120, with the lug 118 dogging the locating and locking mechanism for operation in accordance with the program of cam 110. At the turret station at which recessing is to take place, the cam lug 100 may have been effective to close the contacts of a normally open switch 121 so as to energize a solenoid 122 for actuating a relatively short-throw cranking means 123. The resultant throw of the cranking means 123 will be understood to place the lug 117 in dogging relation with the cam follower 61. When the follower of switch 121 strikes the cam lug 101, the switch contacts will be opened and the solenoid 122 may release the selector bar for a shift back to the position shown in Fig. 6. At another indexed position of the turret, a cam 124, which may be mounted upon a tube 125 which indexes with the turret 128, may actuate a switch 126 to close a circuit energizing a solenoid 127. The solenoid 127 may be connected by cranking means 128 of relatively large throw to the selector bar 115, and it will be understood that, when solenoid 127 is energized, the selector bar may be pulled all the way to the left (in the sense of Fig. 6) for engagement of the lug 116 in dogging relation with the cam follower 60. Since the throw of the cranking means 128 exceeds the desired throw of cranking means 123, lost-motion means is preferably included in the connection of solenoid 122 to the selector bar 115, and in the form shown this lost motion is permitted by a pivotal break between the two arms of the cranking means 123. In order then for the solenoid 122 to drive the selector bar 115, the driving arm 123' of the crank means 123 may intercept a lug 129 on the other arm of the cranking means 123, as will be understood.

In order to demonstrate a machine operation utilizing all three of the cams 57—58—110, I have shown a timing layout in Fig. 7 much the same as the upper part of the layout of Fig. 5.

In Fig. 7, four cycles of turret feeding are serially developed. In the first cycle, the normal cam 57 is shown in solid outlines to indicate that the turret is locked and unlocked at the first station in accordance with a normal program, as to permit a drill operation by a drill supported on the turret at the first working station. Upon indexing to the second station, the cam 124 will have relinquished control over the selector bar 115, and the switch 121 will have been closed in order to select the recessing program of cam 58, as shown in solid outlines for the second turret station. Upon completion of the recessing operation, the turret will have been indexed into the third working station where forming may continue and cut-off may take place; also, there may be a finish-turning operation, and in order to prevent drawback marks the switch 121 will have been opened by cam lug 101 to allow selector bar 115 to assume the position shown in Fig. 6, so that there may be an incremental indexing of the turret just before drawback of the turning tool.

In describing the arrangements of Figs. 1 to 5, all forming operations including cut-off took place for the second indexed position of the turret. For the arrangement of Fig. 7, however, cut-off cannot take place at the second station, but upon a proper timing of the forming-slide camshaft 20 with respect to the turret camshaft 31, and upon a proper placement of the cut-off cam 23' with respect to the forming cams and with respect to the recessing cam 26, and upon a proper placement of the cross-slide throw-out lug 92, cut-off may continue during the second and third indexed positions of the turret, with the cut-off being completed after withdrawal of the turning tool or tools at the third station, as will be clear. Since the fourth station is not used in the form shown, the turret camshaft 31 may be thrown into high-speed drive (by means not shown) in order quickly to pass up the fourth turret station and to set the tools for another cycle of work upon the next fed-out length of stock 11.

In certain instances, it may be desirable to perform turning, chamfering or the like turret-controlled operations at the same indexed station at which recessing is to take place; and it may, at the same time, be desired to avoid drag-off marks by the turning tool. In such case, the turning or chamfering tool may be mounted in tandem with the recessing tool and in position to engage the work 11, on the side of the work in the direction of which the tool slide 19 may partially rotate the turret 28; and a special cam 26' (see Fig. 8) may be employed in place of the cam 26 to drive the cross slide 19. In operation then, at the recessing station of the turret 28, the turned surface would be developed as the turret is fed into the work; the turning operation would be completed as the rise 130 of cam 26' begins to advance the recessing tool 41 radially within the work; during such advance of the recessing tool 41, the turning tool would be carried radially away from the work 11; upon retraction of the recessing tool 41 after cutting the recess, the turning tool would approach the work 11 again, but a cam dwell 131 would stop retraction at a point short of full retraction of the turning tool and after the recessing tool 41 has radially cleared the inner surface of the work; and the turret would then be axially retracted so that the tools may clear the work sufficiently for indexing. The dwell 131 may be of duration to permit the turning tool to clear the work as the turret is retracted, as will be understood. It will further be understood that the dwell 131 may be so close to a full retraction as to permit assured reengagement of the locating lever 53 with one of the turret-locking slots 55 (under control of cam 58, as above described), and that such proximity to a full retraction may still provide sufficient turning-tool clearance with work 11 to avoid drag-off marks.

It will be seen that I have described ingenious mechanisms for adding flexibility to the operations that may be performed by an indexing machine of the character indicated. All the added functions that may thus be performed may be called for and set up by the mere placement of readily adjusted cams and lugs and other timing devices. As for the recessing function, it will be noted that control need never be relinquished over the location of the turret and, in fact, no time need be sacrificed in transferring a locating control of the turret from the Geneva mechanism to the locating and locking mechanism and to the cross-slide 19, no matter which function of the locating and locking mechanism may have been selected for the particular indexed station of the turret.

While I have described my invention in detail for the preferred forms shown, it will be understood that modifications may be made within the scope of the invention as defined in the appended claims.

I claim:

1. In a machine of the character indicated, a work holder, a tool holder, feed means for one of said holders, indexing means for indexing one of said holders relatively to the other of said holders, locating means operative to locate said one holder in successive indexed positions, coordinated drive means for said feed means and for said indexing means and for said locating means, said locating means including means first releasing said locating means and then engaging said locating means during the period in which said one holder is in at least one indexed position and while said holders are in fed-in relation.

2. In a machine of the character indicated, a work-holder, a tool holder, one of said holders being indexible relatively to the other of said holders, indexing means for said indexible holder, locating means for said indexible means and effective to locate said indexible means when in a plurality of indexed positions, feed means for feeding said holders relatively to each other, coordinated drive means for said indexing means and for said locating means and for said feed means said locating means including a first means locating said indexible means for substantially the full period between indexes for one indexed position of said indexible means, said locating means further including second means operative while said indexible means is in a second indexed position, said second means including a cam with a profile determining a locating and a releasing followed by a locating of said indexible means while said indexible means is in said second indexed position, and while said holders are in fed in relation whereby while said indexible means is in said second position there may be an interval during which an incremental indexing movement of said indexible means may be employed to produce a working relative movement of said holders.

3. In a machine of the character indicated, a spindle, an indexible turret, feed means determining a feeding and a withdrawing movement of said turret, locating means for said turret means and movable into and out of locating relation with said turret and including actuating means connected for operation in timed relation with said feed means, said actuating means including a cam determining a location of said turret during a feeding movement and during a withdrawing movement of said feed means, said cam including a profile determining a release of said turret during the period between completion of a feeding movement and commencement of a withdrawing movement of said feed means.

4. In a machine of the character indicated, a spindle member, a turret member, a work holder on one of said members, a tool holder on the other of said members, one of said members being indexible relatively to the other, indexing means for said one of said members, feed means for feeding said members relatively to each other, cross-slide means including feed means coupled for timed operation with respect to said first-mentioned feed means, and follower means carried by said turret member and driven by said cross-slide means and in partial index-driving relation with said turret member, said last-defined means being effective for one indexed relative position of said members, whereby for said one indexed position a movement of said cross-slide means may impart an incremental indexing movement to said turret member.

5. In a machine of the character indicated, a work holder, a tool holder, feed means for one of said holders, indexible means for one of said holders and indexing means therefor, locating means for locating said indexible means at indexed positions about an indexing axis, and including a plurality of program means selectably employable for imparting a plurality of locating programs to said locating means when said indexible means is in each of a plurality of indexed positions, coordinated drive means for said indexing means and for said locating means and for said feed means, and selector means operating in timed relation with the indexing cycle of said indexible means and selecting a first of said program means for one indexed position of said indexible means and selecting a second program means for a second indexed position of said indexible means and selecting a third program means for a third indexed position of said indexible means.

6. In a machine of the character indicated, a work holder, a tool holder, indexing means for indexing said holders relatively to each other, feed means for feeding said holders relatively to each other, locating means for locating an indexed position of said holders, coordinated drive means for said indexing means and for said feed means and for said locating means, said locating means including actuating means responsive to said drive means for actuating said locating means first out of and then into locating position during the period following completion of feed and preceding commencement of withdrawal of said holders at a given indexed position thereof.

7. In a machine of the character indicated, a work holder, a tool holder, feed means for feeding said holders relatively to each other, indexing means for indexing said holders relatively to each other, locating means for locating an indexed position of said holders and including a plurality of program cams selectably engageable for imparting a plurality of locating programs to said locating means when said holders are in each of a plurality of indexed positions, coordinated drive means for said indexing means and for said locating means and for said feed means, and selector means operating in timed relation with the indexing cycle of said indexible means and engaging a first of said cams for one indexed position of said holders and engaging a second of said cams for another indexed position of said holders.

8. A machine according to claim 7, in which said cams are fixedly related to each other for movement in unison regardless of which cam is engaged, and in which said locating means includes separate cam followers for said cams with means for selective engagement to one of said followers to the exclusion of another.

9. In a machine of the character indicated, a work-supporting spindle, a tool-supporting turret, indexing means for indexing said spindle and turret relatively to each other, feed means for feeding said spindle and turret relatively to each other, cross-slide means including an abutment and feed means coupled for timed operation with respect to said first-mentioned feed means, and follower means carried by said turret off the index axis thereof, said follower means for the fed-in relation at one indexed position being in intercepting relation with said abutment with respect to the path of movement of said cross-slide means and being out of such intercepting relation for the fed-out relation at said one indexed position.

10. A machine according to claim 9, in which said follower means is longitudinally aligned for engagement with said abutment when in said one indexed position and when said cross-slide means is in its withdrawn position.

11. A machine according to claim 9, in which said abutment is slotted generally transverse to the path of cross-slide movement, in which the open side of said slot faces said follower means, and in which said follower means includes a projecting element of a size fitting said slot.

12. A machine according to claim 9, and including locating means for said indexing means, and disabling means for said locating means responsive to placement of said spindle and turret at said one indexed position and coordinated with said first feed means to disable said locating means at said one indexed position and after said spindle and turret reach the fed-in position.

13. In a machine of the character indicated, a work holder, a tool holder, indexing means for indexing said holders relatively to each other, feed means for feeding said holders relatively to each other, locating means for locating an indexed position of said holders, coordinated drive means for said indexing means and for said feed means and for said locating means, said locating means including actuating means responsive to said drive means for actuating said locating means first out of and then into locating position during the period following completion of feed and preceding commencement of withdrawal of said holders at a given indexed position thereof; partial-indexing means for partial relative indexing movement of said holders and independent of said first-mentioned indexing means, means connecting said partial-indexing means in controlling relation with said holders at said given indexed position, and actuating means for said partial-indexing means and driven by said drive means during said period.

14. A machine according to claim 13, in which said partial-indexing means is reciprocable, and in which said actuating means effects a full cycle of reciprocation thereof during said period.

15. In a machine of the character indicated, a work-supporting spindle, a tool-supporting turret, indexing means for indexing said spindle and turret relatively to each other, feed means for feeding said spindle and turret relatively to each other, cross-slide means including an abutment and feed means, coordinating means for coordinating the cycles of both said feed means, follower means carried by said turret off the index axis thereof, said follower means for the feed-in relation at one indexed position being in intercepting relation with said abutment with respect to the path of movement of said cross-slide means and being out of such intercepting relation for the fed-out relation at said one indexed position, said second-mentioned feed means including means preventing a full retraction of said cross-slide means until said turret and spindle have been partially retracted, whereby recessing and turning tools may be carried by said turret at said indexed position and yet drag-off marks may be avoided.

16. In a machine of the character indicated, a work holder, a tool holder, first indexing means for indexing said holders relatively to each other, feed means for feeding said holders relatively to each other, fixed locating means operative in timed relation with said indexing means for fixedly locating said holders against relative angular movement when in an indexed position, release means for said fixed locating means, program means for said release means and coordinated with said indexing means and with said feed means and operative at one index position after said holders have reached the fed-in relation, and partial-indexing means coordinated with said program means for partial relative indexing of said holders upon programmed release of said release means at said one index position.

WILLIAM B. RETZ.

REFERENCES CITED

The following references are of record in the file of this patent:

UNITED STATES PATENTS

| Number | Name | Date |
|---|---|---|
| 728,573 | Hanson | May 19, 1903 |
| 1,215,000 | Cone | Feb. 6, 1917 |
| 1,965,714 | Sinclair | July 10, 1934 |
| 2,417,366 | Kylin et al. | Mar. 11, 1947 |